United States Patent
Shimosaka

[11] Patent Number: 5,574,704
[45] Date of Patent: Nov. 12, 1996

[54] HEADER SEARCHING METHOD AND APPARATUS IN A DATA RECORDING MEDIUM

[75] Inventor: Wataru Shimosaka, Sakai, Japan

[73] Assignee: Funai Techno-Systems Co., Ltd., Osaka, Japan

[21] Appl. No.: 512,495

[22] Filed: Aug. 8, 1995

[30] Foreign Application Priority Data

Aug. 11, 1994 [JP] Japan .................................. 6-212152

[51] Int. Cl.⁶ .................................................. G11B 17/22
[52] U.S. Cl. .............................................. 369/32; 369/56
[58] Field of Search ............................ 369/32, 44.28, 369/44.29, 44.27, 44.26, 58, 56, 47, 57, 48, 275.3; 360/53, 48, 74.04, 78.14

[56] References Cited

U.S. PATENT DOCUMENTS

| | | | |
|---|---|---|---|
| 4,800,549 | 1/1989 | Yamagami et al. | 369/32 |
| 4,949,323 | 8/1990 | Yoshida | 369/32 |
| 5,381,424 | 1/1995 | Tsang | 371/40.1 |
| 5,420,839 | 5/1995 | Tateishi | 369/32 |
| 5,504,585 | 4/1996 | Fujinami et al. | 358/335 |

*Primary Examiner*—Tan Dinh
*Attorney, Agent, or Firm*—Jordan and Hamburg

[57] ABSTRACT

On loading a CD-ROM, which is a data recording medium, onto a reproducing device, a time information of a sub-code is read out, and then, a time information of a header is read out. In accordance with a difference between the time information of the sub-code and the time information of the header, an offset value is calculated and memorized. When a time information of a target header is given, by adding the offset value to the given time information of the header, a target time information is calculated, and a sub-code, which indicates a time information equal to the target time information, is searched as a target sub-code. On searching the target sub-code, a time information of the header is read out. By these operations, time for accessing is shorten, on being given the time information of the target header and searching the header.

3 Claims, 5 Drawing Sheets

F I G. 2
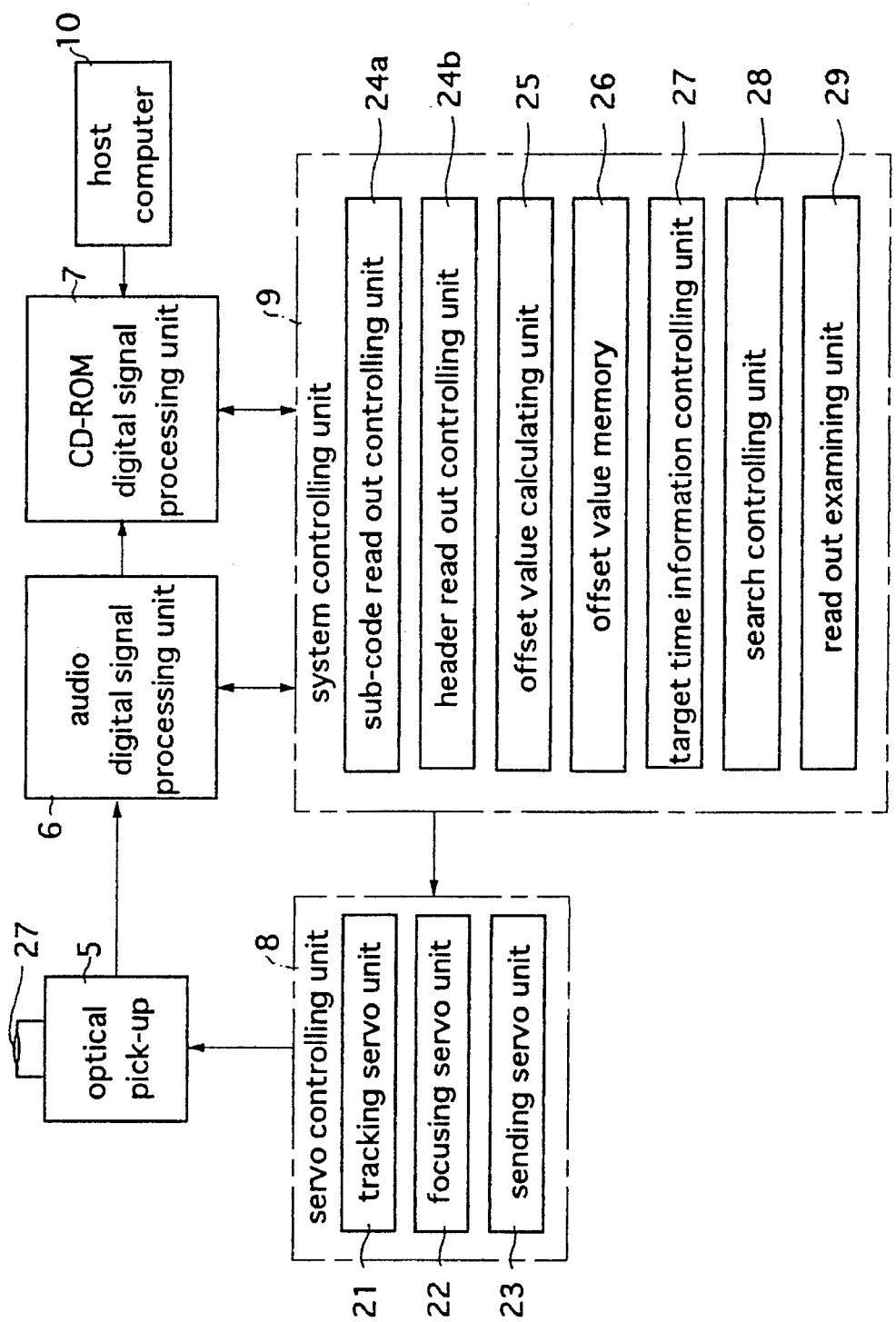

5,574,704

HEADER SEARCHING METHOD AND APPARATUS IN A DATA RECORDING MEDIUM

BACKGROUND OF THE INVENTION

1. Field of the Invention

The present invention relates to a method and an apparatus for reproducing data from a data recording medium such as a CD-ROM and the like, which is provided tracks spirally on a disk, and more particularly to a method and apparatus for searching a target header, when a time information of the target header is given.

2. Description of the Related Art

In a CD-ROM, which is a data recording medium provided tracks spirally, a header composed of time informations for distinguishing data blocks is recorded and a sub-code consisting of a kind of informations is recorded. According to a drive for reproducing informations recorded on the CD-ROM, in response to an order from outside, on searching the target header address, a searching method, in which an address indicated by sub-code (sub-code Q included in it) being able to access rapidly in a drive without changing arrangement of data by de-interleave, was used. In other words, when a sub-code Q indicating an address equal to a target address is searched and an applicable sub-code Q can be searched, continuously, a header address is read out. By the way, in the CD-ROM, generally, there is a slight gap (error) between a time information of the header and a time information of the sub-code Q in a disk. Therefore, in case of that read out header address lags from the target header address, for example, the read out header address is positioned ahead of the target header address and the gap is smaller than previously set value, header address is read out on after another till the target header address will be found.

Also, in case that the read out header address is positioned ahead of the target header address in time and the gap is larger than previously set value or that the read out header address passes the target header address, an address of a sub-code Q corresponding to the gap is calculated and the sub-code Q corresponding to a calculated result is searched. And, when the sub-code Q corresponding to the calculated result is searched, a header address obtained soon after is read out.

However, to reading out in the CD-ROM reproducing device, an optical reading out head is adopted. Therefore, it needs predetermined time to be able to read out data recorded on tracks and, in case that the head moves onto another track, it takes long time for moving the optical reading head. Consequently, in case that, after searching a target sub-code Q and reading out a header address, again, searching a target sub-code Q and reading out the header address are executed, it takes long time from receiving a target header address to reading out a target header address, as a result, it brought about a problem that it needs long time to access data.

SUMMARY OF THE INVENTION

The present invention is provided to solve the above-mentioned problem. An object of the present invention is to provide a header searching method and apparatus in a data recording medium, which is capable to reduce a number of required times to access to a target header and to shorten time, on being given a time information of the target header and searching the header.

According to a header searching method or apparatus in a data recording medium, in case that a time information of a sub-code is coincident with a time information of a header, a distance along the track between a track position on which the sub-code is recorded and a track position on which the header is recorded is regular regardless of a value of the time information. Therefore, on reading out of the time information of the sub-code and reading out of the time information of the header obtained soon after reading out of the sub-code, a difference between read out time information of the sub-code and read out time information of the header indicates a value in response to the distance along the track between the recording position of the sub-code and the recording position of the header. So, an offset value calculated in accordance with the difference is defined as a value for revising the distance along the track between the recording position of the sub-code and the recording position of the header.

Namely, when a time information of a target header is given, a calculation of a target time information, by adding the offset value to given time information of the target header, is a calculation of a time information indicated by the sub-code positioned nearby the header indicating the target time information. Therefore, searching the sub-code, which indicates a time information coincident with the target time information, as the target sub-code is searching near position to the track position on which the target header is recorded. As a result, when the target sub-code is searched, without moving the reading out head, continuously, on reading out of the time information of the header, the header indicating the target time information appears in short time.

Also, according to a header searching apparatus in a data recording medium, in case that a time information of a sub-code Q is coincident with a time information of a header in the CD-ROM, a distance along the track between a track position on which the sub-code Q is recorded and a track position on which the header is recorded is regular regardless of a value of the time information. Therefore, when the target sub-code Q is searched, without moving the reading out head, continuously, on reading out of the time information of the header, the header indicating the target time information appears in short time.

BRIEF DESCRIPTION OF THE DRAWINGS

A preferred form of the present invention is illustrated in the accompanying drawings in which:

FIG. 2 is a block diagram showing a functional construction of a servo controlling unit and a system controlling unit of the CD-ROM drive according to an embodiment of the present invention.

DETAILED DESCRIPTION OF THE PREFERRED EMBODIMENT

Figure 1:
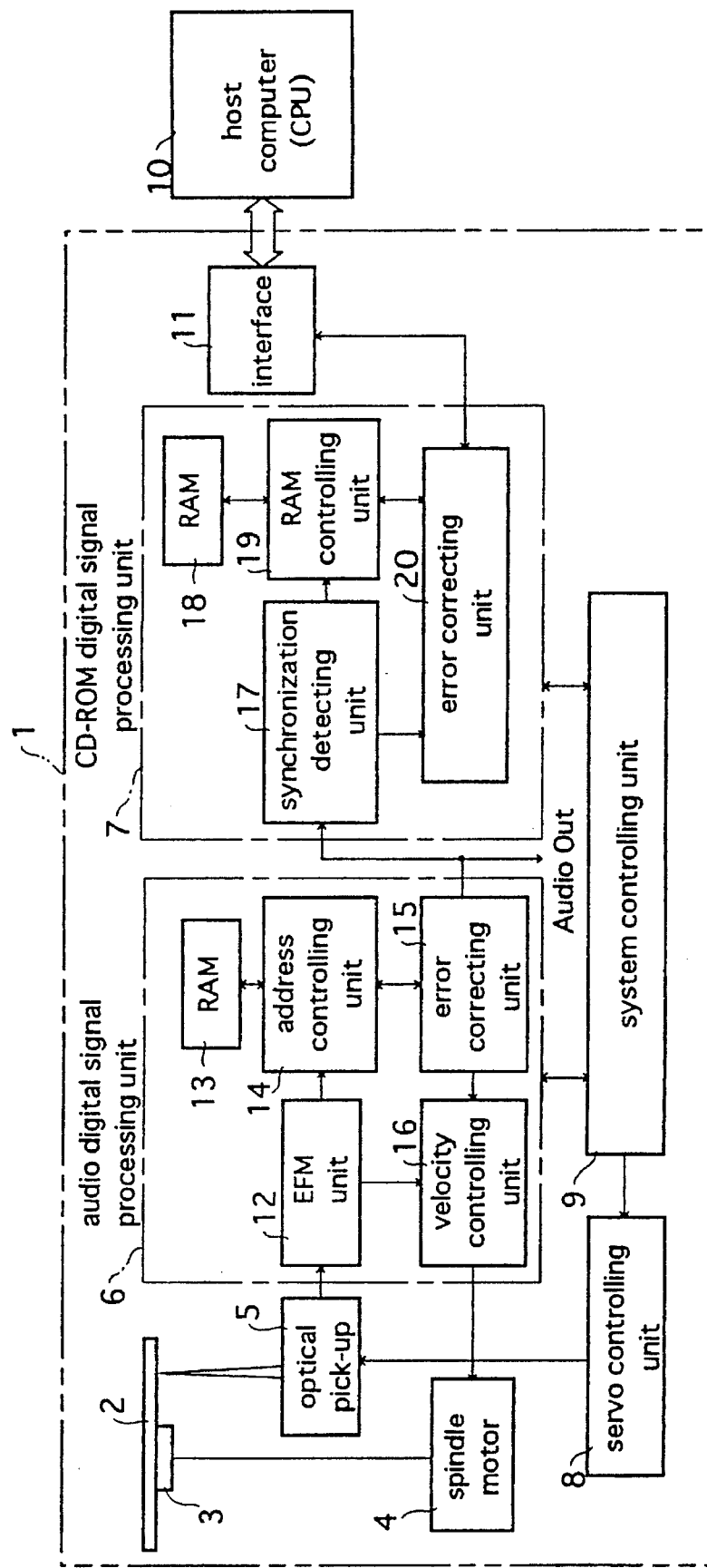
FIG. 1 is a block diagram showing a construction of a CD-ROM drive according to an embodiment of the present invention.

Before the description of the present invention proceeds, it is to be noted that like parts are designated by like reference numerals throughout the accompanying drawings.

FIG. 1 is a block diagram showing a construction of a CD-ROM drive, which reads out data recorded on CD-ROM which is one of an optical disk, data recording medium. Here, it is described about the CD-ROM drive 1 having an audio digital signal processing unit 6 and a CD-ROM digital signal processing unit 7. A CD-ROM 2 is provided tracks spirally, and, on the tracks, a plural data blocks are recorded. And, in accordance with track length of one data block, each data blocks has a header including a time information for distinguishing the data blocks, moreover, in accordance with each data blocks, a sub-code including a time information showing a track position is recorded on each data blocks. In the CD-ROM drive 1 of the present embodiment, searching a target header is carried out by a manner in which, on receiving a time information of a target header, a time information of a sub-code Q from the time information of the header is calculated and a sub-code Q showing a time information equal to the calculated target time information is searched as a target sub-code.

The CD-ROM drive (hereinafter referred to as drive) 1 comprises a disk holder 3 to hold a CD-ROM 2, a spindle motor 4 to rotate the CD-ROM 2, an optical pick-up 5 to read out informations recorded on the CD-ROM 2, the audio digital signal processing unit 6, the CD-ROM digital signal processing unit 7, a servo controlling unit 8 to control focusing, tracking and sending the optical pick-up 5, a system controlling unit 9 including a microcomputer to control the servo controlling unit 8, and an interface 11 to communicate with a host computer 10.

On the CD-ROM 2, by one track eddying spirally from inside to outside, the plural of tracks are formed, and, on tracks, informations consisted by various kinds of data are recorded. The spindle motor 4 rotates and controls the CD-ROM 2 to be able to record on tracks on the CD-ROM 2 at a constant linear velocity, by controlling signal from the audio digital signal processing unit 6. The optical pick-up 5 illuminates a spot light on tracks on the CD-ROM 2, receives the reflecting light and reads out data. Also, it is consisted to be able to move in a direction of a radial of the CD-ROM 2. On the optical pick-up 5, as shown in FIG. 2, an object lens 27 is provided to condense spot light, and the object lens 27 is arranged to be able to move in the direction of the radial of the CD-ROM 2 and in the up and down direction from the CD-ROM 2. By moving of the object lens 27 in the direction of the radial, tracking servo is executed, and by moving of the object lens 27 in the up and down direction, focusing servo is executed. By tracking servo, if the CD-ROM 2 rotates with skew, spot light always precisely traces along with track. Also, by focusing servo, even if a plane of the CD-ROM 2 rolls, spot light on the CD-ROM 2 is condensed to predetermined radial. The servo controlling unit 8 controls above-mentioned tracking servo, focusing servo and sending servo to move the optical pick-up 5 in the direction of the radial.

The audio digital signal processing unit 6 comprises an Eight to Fourteen Modulation (EFM) unit 12 to be inputted signal from the optical pick-up 5, a RAM 13 to memorize data, an address controlling unit 14 to control writing or reading data from the RAM 13, an error correcting unit 15 to correct error of data by Cross Interleaved Reed-Solomon Code (CIRC) and a velocity controlling unit 16 to control the spindle motor 4 by spindle servo. The Eight to Fourteen Modulation unit 12 modulates data, which is modulated from 8 bits data to 14 bits data and recorded on the CD-ROM 2, to former 8 bits data. And, the velocity controlling unit 16 outputs driving signal for velocity controlling the spindle motor 4, in accordance with the read out information of track. In usual reproducing, the velocity controlling unit 16 rotatively controls the spindle motor 4 to keep predetermined linear velocity on track on the CD-ROM 2 (the number of rotations is fewer in inside and gets more as going outside). In searching, the velocity controlling unit 16 controls to keep the spindle motor 4 with the number of rotations of a target track with adding or reducing velocity. The address controlling unit 14 de-interleaves recorded data which is interleaved in accordance with an address map in the RAM 13. An output from the error correcting unit 15 is output to outside as audio signal and inputted to the CD-ROM digital signal processing unit 7.

The CD-ROM digital signal processing unit 7 comprises a synchronization detecting unit 17, a RAM 18 to store reproduced data, a RAM controlling unit 19 to control writing or reading from the RAM 18 and an error correcting unit 20 to correct error by Error Correction Code (ECC) and Error Detecting Code (EDC) peculiar to CD-ROM. The synchronization detecting unit 17 detects synchronous data of data processed by the audio digital signal processing unit 6 and, in accordance with the result of the detected synchronous data, removes scramble processed on data in recording. Also, the RAM controlling unit 19 checks a header address of the data in reproduced data stored in the RAM 18. The host computer 10 inputs the order such as track searching and so on into the CD-ROM digital processing unit 7 via the interface 11.

Also, the system controlling unit 9 receives signal from the audio digital signal processing unit 6 and the CD-ROM digital signal processing unit 7 and outputs controlling signal to the servo controlling unit 8 to control each servo for focusing, tracking and sending for the optical pick-up 5.

FIG. 2 is a block diagram showing functional construction of the servo controlling unit 8 and the system controlling unit 9. The servo controlling unit 8 includes a tracking servo unit 21 to execute tracking control of the optical pick-up 5, a focusing servo unit 22 to execute focusing control of the object lens 27 of the optical pick-up 5 and a sending servo unit 23 to send the optical pick-up 5 in the direction of the radial of the CD-ROM 2 (containing movement in which the optical pick-up 5 jumps in track searching).

The system controlling unit 9 includes below-mentioned functional units. A sub-code read out controlling unit 24a reads out a time information of an optional sub-code, when the CD-ROM 2 is loaded on the drive 1. A header read out controlling unit 24b reads out a time information of a header obtained soon after reading out the time information of the sub-code. An offset value calculating unit 25 calculates an offset value in accordance with a difference between the time information of the sub-code and the time information of the header, which are read out by each read out controlling units. An offset value memory 26 memorizes the calculated offset value and uses predetermined area of a memory. A target time information calculating unit 27 calculates a target time information by adding the offset value memorized in the offset value memory 26 to given time information of the header. A search controlling unit 28 searches a sub-code, which indicates a time information equal to the target time information, as a target sub-code. A read out examining unit 29 reads out the time information of the header obtained soon after searching the target sub-code by the above-mentioned searching and examines whether or not the time information of the header is coincident with the time information of the target header, when the target sub-code is searched.

Next, a controlling operation of the drive 1 constructed as mentioned above is described.

Figure 3:
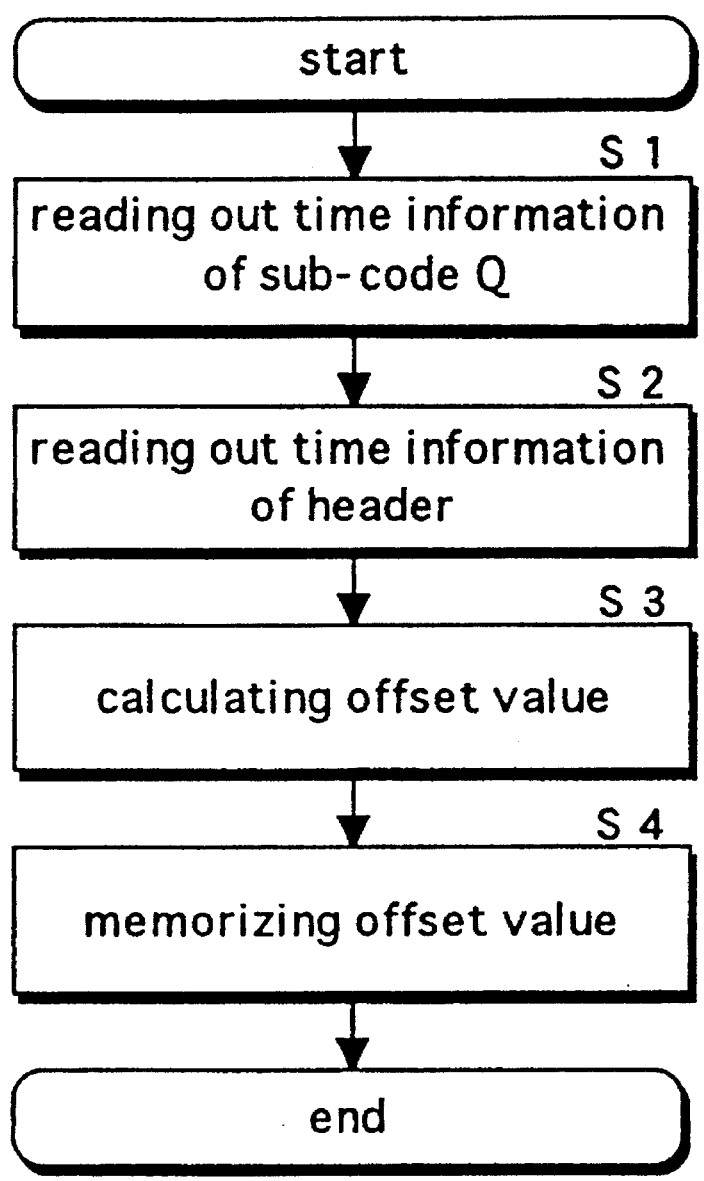
FIG. 3 is a flowchart showing a method for calculating an offset value in the CD-ROM drive.
Figure 4:
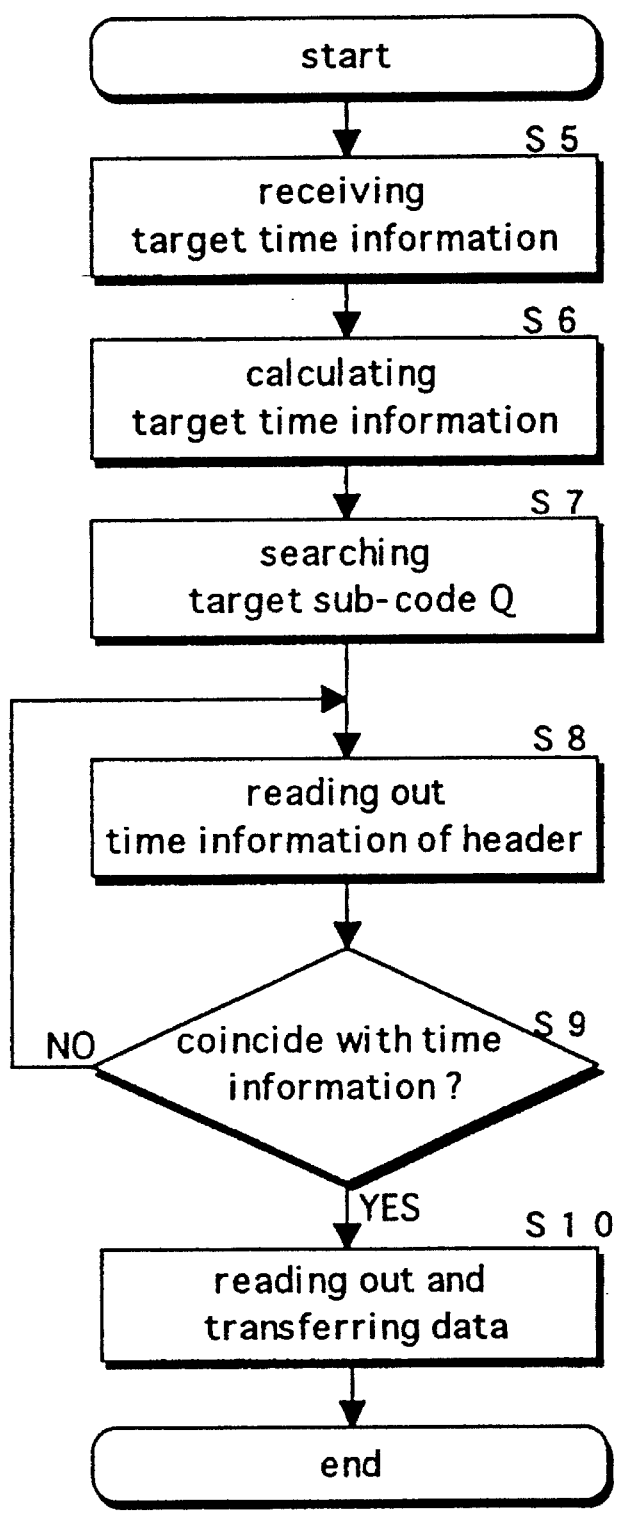
FIG. 4 is a flowchart showing a method for searching a header, when a time information of a target header is given in the CD-ROM drive.
Figure 5:
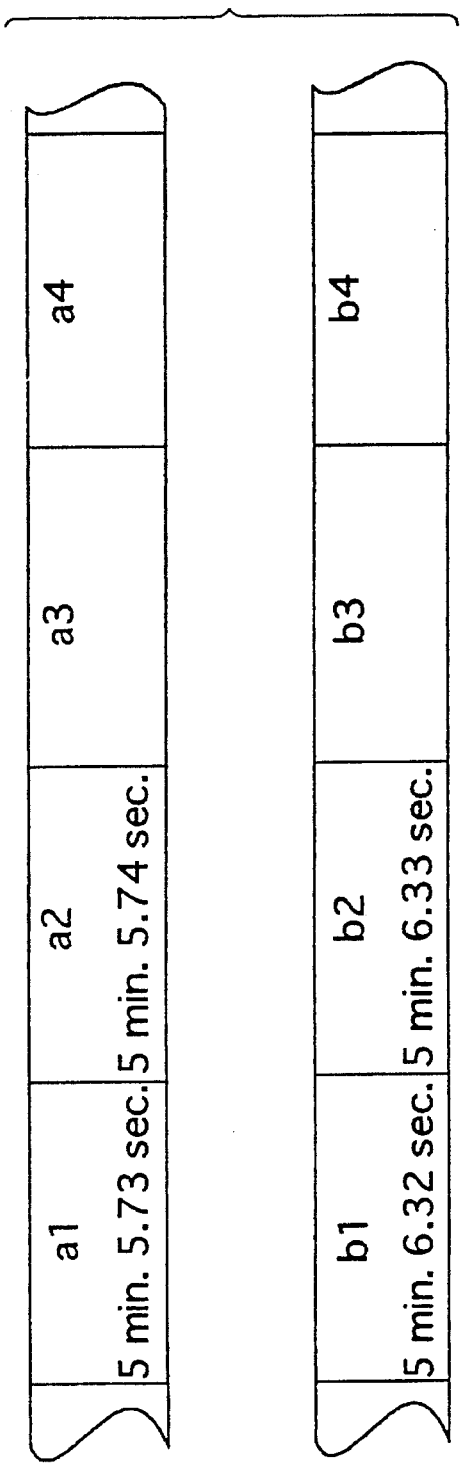
FIG. 5 is a explanatory view showing a mutual relationship between a recording position of the sub-code Q and a recording position of the header in the CD-ROM drive.

FIG. 3 is a flowchart showing an embodiment of a method for calculating the offset value and FIG. 4 is a flowchart showing a method for searching a header, on being given a time information of a target header from the host computer 10. FIG. 5 is a explanatory view showing a mutual relationship between a recording position of a sub-code Q and a recording position of a header. In FIG. 5, one section is one unit of the block.

First, on loading the CD-ROM 2 on the drive 1, the sub-code read out controlling unit 24a of the system controlling unit 9 reads out a time information of an optional sub-code Q (at step S1). In the present embodiment, the optional sub-code Q is a sub-code Q indicating predetermined time information. When reading out of the sub-code Q indicating predetermined time information is finished, the header read out controlling unit 24b reads out a time information of a header obtained successively (at step S2). When reading out of the sub-code Q indicating predetermined time information and reading out of the time information of the header obtained successively are completed, the offset value calculating unit 25 calculates the offset value in accordance with a difference between the read out time information of the sub-code Q (equal to predetermined time information) and the read out time information of the header, and calculated offset value is memorized in the offset value memory 26 (at steps S3 and S4). By the above-mentioned operations, the offset value is found.

The above-mentioned method for finding the offset value is concretely described accompanying with FIG. 5. It is supposed that, when a sub-code and a header of the CD-ROM 2 loaded on the drive 1 are read out, a time information of a sub-code Q a2 indicates 5 minutes 5.74 seconds, and a time information of a header b2 indicates 5 minutes 6.33 seconds (1 second composed of 75 data blocks). In this case, a header showing a time information indicating 5 minutes 5.74 seconds equal to the time information of the sub-code Q a2 is recorded forward for 34 data blocks in time, compared with the header b2. This relationship exists on another track position, for example, if an optional sub-code Q is a3, a header showing a time information equal to a time information of the optional sub-code Q a3 is recorded forward for 34 data blocks in time, compared with a header b3.

in case of the above-mentioned relationship between the sub-code Q and the header of the CD-ROM 2, If a sub-code Q read out at above-mentioned step S1 is a2 in FIG. 5 and its time information is 5 minutes 5.74 seconds, a time information of a header b2 read out at step S2 is 5 minutes 6.33 seconds. Namely, a difference between the time information of the sub-code Q a2 and the time information of the header b2 is 34 data blocks, and this value shows that the header is recorded forward for 34 data blocks in time, compared with the sub-code Q. As a result of this, at step S3, by expecting of 1 data as leeway for the found difference 34 data blocks, "−35" is calculated as a offset value. And, at step S4, the offset value is memorized in the offset value memory 26.

Hereinafter, a method for searching the header, when a time information of a target header is given from the host computer 10, will be described accompanying with FIG. 4. Now, if a time information of a header b2 in FIG. 5 is 5 minutes 6.33 seconds, since the header positions forward for 34 data blocks in time, compared with the sub-code Q, a time information of the sub-code Q a2 is 5 minutes 5.74 seconds. Also, a time information of a sub-code Q a1 is 5 minutes 5.73 seconds. For example, if 5 minutes 6.33 seconds is given from the host computer 10 as a target time information, the system controlling unit 9 receives a time information 5 minutes 6.33 seconds (at step S5). And then, the target time information calculating unit 27 reads out the offset value "−35" memorized in the offset value memory 26 and, by adding the offset value "−35" to the received time information 5 minutes 6.33 seconds, calculates 5 minutes 5.73 seconds as the target time information (at step S6).

On completing the above-mentioned calculation of the target time information, the search controlling unit 28 starts searching of the sub-code Q indicating the target time information (at step S7). In this searching, the sub-code Q a1 is detected. After detecting the sub-code Q a1, reading out of the time information of the header is started (at step S8). By this operation, the time information of the header b1 indicating 5 minutes 6.32 seconds is read out.

Next, the read out examining unit 29 judges whether or not the time information read out by the above-mentioned operation is coincident with the received time information, in other words, 5 minutes 6.33 seconds (at step S9). If no at step S9, the procedure goes back to step S8, and a time information of a header successive to the header read out by the above-mentioned operations is read out. Namely, a time information of a header b2 successive to b1, 5 minutes 6.33 seconds is read out. At next step S9, since the target time information 5 minutes 6.33 seconds is coincident with the read out time information, the procedure goes to step 10. At step S10, data successive to the header is read out and the read out data is transferred to the host computer 10.

As mentioned above, a predetermined offset value is previously found, a sub-code Q indicating a target time information added the offset value is searched. By these operations, when the sun-code Q is searched, the optical pick-up 5 has accessed a vicinity of a target header. Consequently, without moving a reading out head, by the second reading out of a time information of a header soon after the first reading out of time information of a header, in most case, it is accomplished to be coincident with the target time information.

As many apparently widely different embodiments of this invention may be made without departing from the spirit and scope thereof, it is to be understood that the invention is not limited to the specific embodiments thereof except as defined in the appended claims.

What is claimed is:

1. A header searching method in a data recording medium in which tracks are formed spirally and records a plurality of data blocks, and the data blocks comprises a header including a time information to distinguish each data block and records a sub-code including a time information showing a track position corresponding to each data block, comprising:

first reading out step in which a time information of an optional sub-code is read out, when the data recording medium is loaded in a reproducing device;

second reading out step in which a time information of the header obtained successively to reading out the sub-code is read out;

calculating and memorizing step in which an offset value is calculated in accordance with a difference between read out time information of the sub-code and the time information of the header, and calculated offset value is memorized;

calculating step in which, when a time information of a target header is given, a target time information is calculated by adding the offset value, which is memorized at the calculating and memorizing step, to given time information of the header;

searching step in which a sub-code, which indicates a time information equal to the target time information, as a target sub-code is searched; and, reading and examining step in which a time information of the header obtained successively to searching the target sub-code obtained at the searching step is read out, and it is examined whether or not the time information of the header is coincident with the time information of the target header.

2. A header searching apparatus in a data recording medium in which tracks are formed spirally and records a plurality of data blocks, and the data blocks comprises a header including a time information to distinguish each data block and records a sub-code including a time information showing a track position corresponding to each data block, comprising:

first reading out means which reads out a time information of an optional sub-code, when the data recording medium is loaded in a reproducing device;

second reading out means which reads out a time information of the header obtained successively to reading out the sub-code;

calculating and memorizing means which calculates an offset value in accordance with a difference between read out time information of the sub-code and the time information of the header, and memorizes calculated offset value;

calculating means which calculates, when a time information of a target header is given, a target time information by adding the offset value, which is memorized at the calculating and memorizing step, to given time information of the header;

searching means which searches a sub-code, which indicates a time information equal to the target time information, as a target sub-code; and, reading and examining means which reads out a time information of the header obtained successively to searching the target sub-code by the searching means, and examines whether or not the time information of the header is coincident with the time information of the target header.

3. A header searching apparatus in a data recording medium as claimed in claim 2, wherein the data recording medium is CD-ROM and the sub-code is a sub-code Q.

* * * * *